(12) United States Patent
Tambasco

(10) Patent No.: US 11,988,870 B2
(45) Date of Patent: May 21, 2024

(54) BILAYER SILICON NITRIDE POLARIZATION SPLITTER AND ROTATOR

(71) Applicant: Cisco Technology, Inc., San Jose, CA (US)

(72) Inventor: Jean-Luc Joseph Tambasco, Macungie, PA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 52 days.

(21) Appl. No.: 17/675,057

(22) Filed: Feb. 18, 2022

(65) Prior Publication Data
US 2023/0266531 A1 Aug. 24, 2023

(51) Int. Cl.
G02B 6/12 (2006.01)
G02B 6/122 (2006.01)
G02B 6/125 (2006.01)

(52) U.S. Cl.
CPC ........... G02B 6/1228 (2013.01); G02B 6/125 (2013.01); G02B 2006/12061 (2013.01); G02B 2006/1215 (2013.01)

(58) Field of Classification Search
CPC .......... G02B 6/1228; G02B 6/125; G02B 2006/12061; G02B 2006/1215
USPC ............. 385/11, 14, 24, 27–30, 43, 49–50
See application file for complete search history.

(56) References Cited

U.S. PATENT DOCUMENTS

| 8,873,899 B2* | 10/2014 | Anderson ............ G02B 6/2773 385/11 |
| 8,948,555 B1 | 2/2015 | Roth et al. |
| 9,122,006 B1 | 9/2015 | Roth et al. |
| 9,547,127 B1 | 1/2017 | Lin et al. |
| 10,191,214 B2* | 1/2019 | Dong .................. G02B 6/2773 |
| 11,042,050 B1* | 6/2021 | Lee ....................... G02B 6/2766 |
| 11,061,123 B1* | 7/2021 | Shen ....................... G01S 17/06 |
| 2008/0226224 A1 | 9/2008 | Blauvelt et al. |
| 2018/0059324 A1 | 3/2018 | Tu et al. |

OTHER PUBLICATIONS

Sangsik Kim, et al., "Mode-evolution-based polarization rotation and coupling between silicon and hybrid plasmonic waveguides," Scientific Reports, Dec. 18, 2015, 7 pages.

Yunhong Ding, et al., "Wideband Polarization Splitter and Rotator with Large Fabrication Tolerance and Simple Fabrication Process," Optics Letter, vol. 38, No. 8, Apr. 15, 2013, 3 pages.

Kang Tan, et al., "Three-Dimensional Polarization Splitter and Rotator Based on Multi-Layer Si3N4-on-SOI Platform," IEEE, 2016, 2 pages.

(Continued)

*Primary Examiner* — Kaveh C Kianni
*Assistant Examiner* — Hung Q Lam
(74) *Attorney, Agent, or Firm* — Edell, Shapiro & Finnan, LLC

(57) ABSTRACT

A photonic polarization splitter rotator (PSR) includes a substrate, a first optical waveguide disposed on the substrate at a first layer, the first optical waveguide having a substantially rectangular shape and longitudinally arranged between a first end of the first optical waveguide and a second end of the first optical waveguide, and a second optical waveguide arranged to have a partial and fixed amount of overlap over a predetermined length of the first optical waveguide.

20 Claims, 12 Drawing Sheets

(56) References Cited

OTHER PUBLICATIONS

Daoxin Dai, et al., "Novel Concept for Ultracompact Polarization Splitter-Rotator Based on Silicon Nanowires," Optics Express, vol. 19, No. 11, May 23, 2011, 10 pages.
Sacher, W., et al, "Polarization rotator-splitters in standard active silicon photonics platforms," Optics Express, vol. 22, No. 4, https://pubmed.ncbi.nlm.nih.gov/24663698/, Feb. 24, 2014, 10 pages.
Globalfoundries, "Silicon Photonics Platform," Japan SOI Design Workshop, Oct. 2018, 16 pages.
Anderson, Sean P., "Silicon Photonic Polarization-Multiplexing Nanotaper for Chip-to-Fiber Coupling," Journal of Lightwave Technology, vol. 34, No. 2, https://ieeexplore.ieee.org/document/7327128, Nov. 11, 2015, 7 pages.

\* cited by examiner

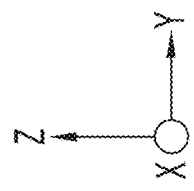
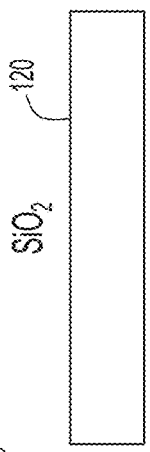
FIG.2A
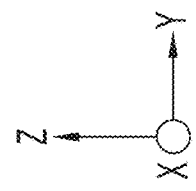
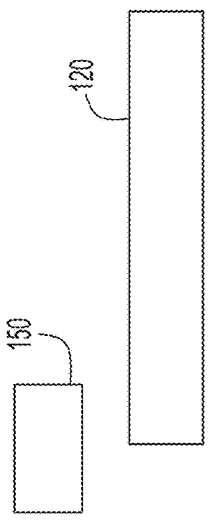
FIG.2B
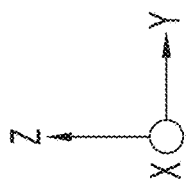
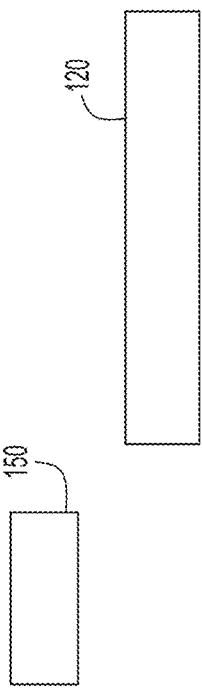
FIG.2C

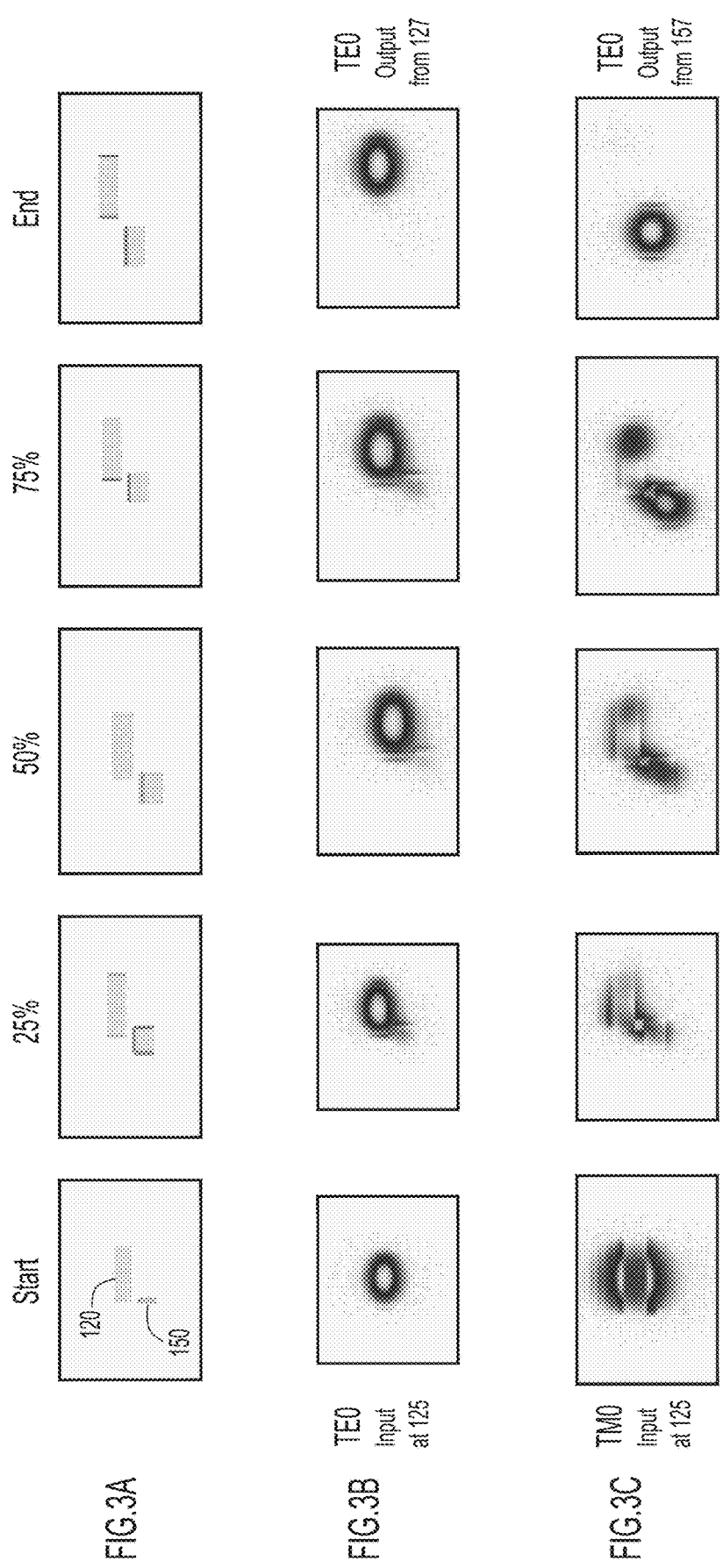

BILAYER SILICON NITRIDE POLARIZATION SPLITTER AND ROTATOR

TECHNICAL FIELD

Embodiments described herein are directed to a photonic polarization splitter and rotator or "PSR."

BACKGROUND

For coherent transmission, dual polarization division multiplexing (DPDM) helps to increase the bandwidth of an optical fiber by a factor of two. DPDM Quadrature Phase Shift Keying (DP-QPSK) is one of the most important modulation mechanisms for long-haul coherent transmission. A polarization splitter and rotator (PSR) is one of the fundamental building blocks of a DP-QPSK transceiver. In order to launch two polarizations from a photonic integrated circuit (PIC) to an optical fiber, a PSR is configured to multiplex polarizations on the transmission (TX) side. A PSR can also be used in the opposite direction to de-multiplex polarizations at the receiver (RX) side to ensure the PIC (at the RX side) receives only light of a single polarization on an appropriate waveguide.

More specifically, on the RX side, a PSR transforms a single waveguide carrying both a transverse electric optical signal (e.g., TE0) and a transverse magnetic optical signal (e.g., TM0) into two isolated waveguides each carrying TE0. A high index contrast material is typically used to strongly break the optical symmetry of the waveguide, enabling polarization rotation (TM0→TE1). Typically, a modemux follows the rotation stage, converting TE1 into TE0 of an isolated waveguide.

Many PSRs rely on silicon, especially poly-silicon, as part of an overall PSR design. While poly-silicon enables efficient hybridization and hence, mode rotation, that material can also lead to undesirable insertion loss, mainly in the TM mode, leading to polarization dependent loss, fluctuations on the receiver, and an increased bit error rate.

BRIEF DESCRIPTION OF THE DRAWINGS

FIGS. 2A, 2B, and 2C show, respectively, cross-sectional views at I-I, II-II, III-III of the first PSR shown in FIG. 1, according to an example embodiment.

FIG. 3A shows the relative locations of a first optical waveguide and a second optical waveguide of the first PSR from a first end to a second end along a longitudinal direction of the first PSR, according to an example embodiment.

FIGS. 3B and 3C show, respectively, and corresponding to FIG. 3A, simulated optical power of a TE0 signal in the first optical waveguide, and a TM0 signal rotated to TE0 in the second optical waveguide, according to an example embodiment.

DESCRIPTION OF EXAMPLE EMBODIMENTS

Overview

Figure 1:
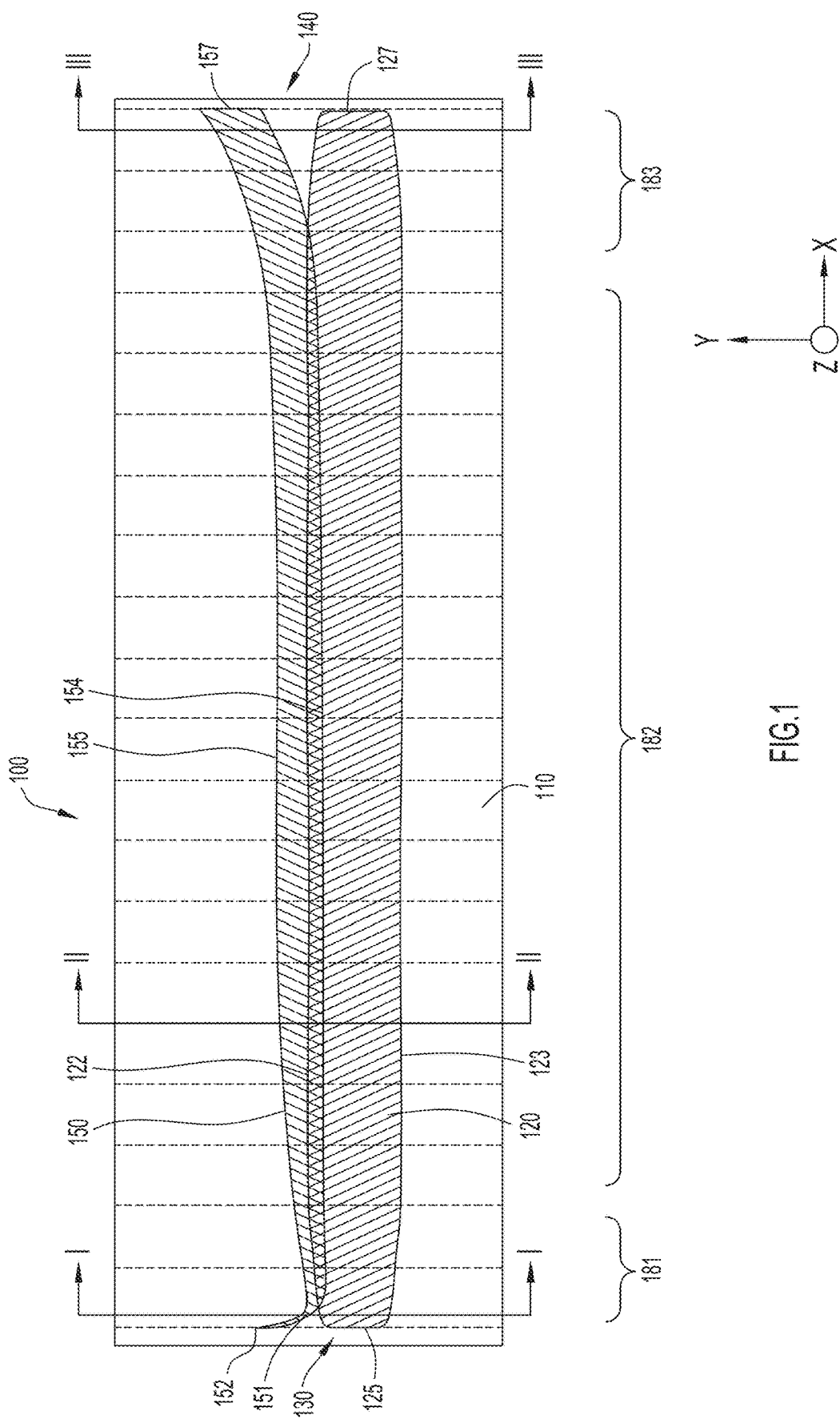
FIG. 1 shows a plan view of a first polarization splitter and rotator (PSR), according to an example embodiment.

Presented herein is a polarization splitter and rotator (PSR) that includes a substrate, a first optical waveguide disposed on the substrate at a first layer, the first optical waveguide having a substantially rectangular shape and longitudinally arranged between a first end of the first optical waveguide and a second end of the first optical waveguide, and a second optical waveguide arranged at a second layer and further arranged to have a partial, and fixed amount of, overlap over a predetermined length of the first optical waveguide. In one embodiment, the predetermined length of the first optical waveguide corresponds to a rotator section of the polarization splitter rotator.

In another embodiment, a PSR includes a first optical waveguide, a second optical waveguide, wherein the device includes a first region, a second region, and a third region, the second region disposed between the first region and the second region, wherein in the first region, the second optical waveguide comprises a bent end that is translated away from the first optical waveguide, wherein in the second region, the second optical waveguide has a first edge that shifts away at a diagonal from a second edge of the second optical waveguide, and the second optical waveguide at least partially overlaps with the first optical waveguide, and wherein in the third region, the second optical waveguide translates fully away from any overlap with the first optical waveguide.

In still another embodiment, a method is provided. The method includes inputting light, from an optical fiber, at a first end of a first optical waveguide disposed in a substrate, causing the light to interact with a second optical waveguide partially overlapping with the first optical waveguide, the second optical waveguide including a first end of the second optical waveguide and a second end of the second optical waveguide, wherein the second optical waveguide includes a bent end narrowing to a tip at the first end of the second optical waveguide, and only one edge of a portion of the second optical waveguide shifts away at a diagonal from a side of the first optical waveguide over a predetermined length of the first optical waveguide, outputting a first optical signal at a second end of the first optical waveguide, and outputting a second optical signal at the second end of the second optical waveguide.

Example Embodiments

Described herein is a photonic component, namely a polarization splitter and rotator (PSR), that both rotates and modemuxes at the same time by presenting light to one of two vertically stacked optical waveguides. In the embodiments described herein, a first (e.g., lower) waveguide of the vertically stacked waveguides is disposed on a substrate and has a substantially rectangular shape that does not translate (i.e., bend, shift, or angle away from a longitudinal axis). A second (e.g., upper) waveguide of the vertically stacked waveguides is disposed above the first waveguide. The second waveguide is characterized by a unique translation profile over its length. In an embodiment, both the first waveguide and the second waveguide are comprised of silicon nitride ($Si_3N_4$, or "SiN" for shorthand). Those skilled in the art will appreciate that the terms "lower" and "upper" are merely meant to indicate relative position and not meant to suggest strict orientation. That is, the orientation of the PSR will dictate which waveguide of the two may be referred to as an "upper" or "lower" waveguide.

Polarization rotating is normally more sensitive than modemuxing, and thus more space is often allocated to the rotating function. However, by modemuxing at the same time as rotating, the modemuxing operation is essentially "free," i.e., no additional or dedicated space is needed for that operation. Furthermore, modemuxing, in accordance with an embodiment, does not operate on TE1 (which is a costly operation). Instead, the modemuxing operation of the described embodiments strips TE0, a well-confined mode that can be rapidly manipulated. As will be explained below in detail, in an embodiment described herein, the second waveguide is arranged in a particular way so that rotation is induced at the same time that modemuxing is occurring.

Reference is now made to the figures, beginning with FIG. 1, which shows a plan view of a first polarization splitter and rotator, or PSR 100, according to an example embodiment, and to FIGS. 2A, 2B, and 2C, which show, respectively, cross-sectional views taken at I-I, II-II, III-III of PSR 100 shown in FIG. 1, according to an example embodiment. PSR 100 is fabricated within/on a substrate 110 (e.g., silicon dioxide—$SiO_2$) and includes a first optical waveguide 120 that is disposed in/on substrate 110 at a first layer 250 (with layers disposed at different positions in a z-axis direction). First optical waveguide 120 is disposed between a first end 130 of PSR 100, corresponding to an input 125 of PSR 100, and a second end 140 of PSR 100, corresponding to a first output 127 of PSR 100, along an x-axis. In an embodiment, first optical waveguide 120 is comprised of silicon nitride, and has a substantially rectangular cross section. In some implementations, and as shown in FIG. 1, a region near input 125 and a region near first output 127 may be slightly tapered to, e.g., 1 μm, to better match physical dimensions of prior, or follow-on, optical components. First optical waveguide 120 may have a width (in the y-axis direction) between a first side 122 and a second side 123 of about 1.5 μm (in the non-tapered region), and a thickness in the z-axis direction of about 250 nm. First optical waveguide 120 may be bimodal, thus supporting both TE0 and TE1 modes.

Above first optical waveguide 120, in the z-axis direction, is a second layer 252 of $SiO_2$ about 100 nm thick.

PSR 100 further includes, at a third layer 254, a second optical waveguide 150 disposed in on substrate 110 above second layer 252, and above first layer 250. Second optical waveguide 150 has several characteristic features. Second waveguide may also be comprised of silicon nitride, and have a thickness in the z-direction of about 250 nm. At first end 130 of PSR 100, second optical waveguide 150 comprises a bent end 151. Bent end 151 tapers to a pointed tip 152, and its bend is relatively sharp. Specifically, moving from left to right in FIG. 1, bent end 151 bends toward second end 140 of PSR 100 and a first edge 154 of second optical waveguide 150 begins to overlap with a first side 122 of first optical waveguide 120. Note that the terms "edge" and "Side" are meant to be interchangeable, but are used herein to differentiate between features of first optical waveguide 120 and second optical waveguide 150. Also, the terms "edge" and "side" may be synonymous with the term "boundary" of the waveguides.

Continuing with the left to right description, a second edge 155 of second optical waveguide 150 gradually translates or shifts away, at a diagonal with respect to a longitudinal x-axis direction, from first edge 154 while first edge 154 of second optical waveguide 150 remains relatively parallel with first side 122 and second side 123 of first optical waveguide 120. As second optical waveguide 150 approaches second end 140 of PSR 100, a width of second optical waveguide 150 reaches a steady or fixed value, i.e., first edge 154 no longer translates away from second edge 155. The width of second optical waveguide 150 in that region may be about 1 Second optical waveguide 150 eventually fully translates away from, and eliminates any overlap with, first optical waveguide 120. Second optical waveguide 150 thus provides a second output 157 that is adjacent and parallel to first output 127. Overall, second optical waveguide 150 may have a width in the y-axis direction that ranges from 100 nm at pointed tip 152 to 1 μm at second output 157. The amount or degree of shifting or translation may be linear, or some other slowly varying continuous function; it may also be calculated using an approach like that described in Dominic F. Siriani and Jean-Luc Tambasco, *Adiabatic guided wave optics—a toolbox of generalized design and optimization methods*, Opt. Express 29, 3243-3257 (2021).

PSR 100 may also be described as having three main regions, a first region 181, a second region 182, and a third region 183. First region 181 includes bent end 151 with pointed tip 152 which bends into, and begins to overlap with, first optical waveguide 120. First region 181 may also include a tapered section of first optical waveguide 120. Second region 182 is characterized by first edge 154 of second optical waveguide 150 remaining substantially straight and overlapping with a portion of first optical waveguide 120, while second edge 155 of second optical waveguide 150 translates away from first edge 154 in a diagonal fashion. Third region 183 is characterized by a distance between first edge 154 and second edge 155 of second optical waveguide 150 being spaced at a more constant or fixed distance, while second optical waveguide 150 is translated away from first optical waveguide 120 such that first output 127 of first optical waveguide 120 and second output 157 of second optical waveguide 150 are adjacent one another. Third region 183 may also include a tapered section of first optical waveguide 120.

Thus, those skilled in the art will appreciate that PSR 100 comprises a lower waveguide (e.g., first optical waveguide 120) on a lower layer that remains substantially unchanged along its length (in the x-axis direction) of the device. An upper waveguide (e.g., second optical waveguide 150) is initially configured as a tip, which then bends into the lower waveguide and widens and translates into an optimized "diagonal" region by shifting its outer edge or boundary, before translating away from the lower waveguide to complete a rotation/modemux operation when an optical signal is introduced at input 125.

Still with reference to FIG. 1, it can be seen that the second optical waveguide 150 is arranged to have a partial and fixed amount of overlap over a predetermined length of the first optical waveguide. And, that predetermined length of the first optical waveguide may correspond to a rotator section of the PSR 100, e.g., second region 182. The overlap in region 182 may constitute less than 50% of the width of each of the first optical waveguide 120 and the second optical waveguide 150.

In one embodiment, PSR 100 may have an overall length, in the x-axis direction, of 400-500 μm. PSR 100 demonstrates low loss and polarization loss, and is high-power handing given the absence of silicon, and the use instead of silicon nitride, for the waveguides.

Reference is now made more specifically to FIGS. 2A, 2B, and 2C, which correspond roughly to first region 181, second region 182, and third region 183, respectively. FIG. 2A shows first region 181 where bent end 151 with pointed tip 152 does not overlap first optical waveguide 120. FIG. 2B shows second region 182 where second optical waveguide 150 partially overlaps with first optical waveguide 120. FIG. 3B shows third region 183 where a distance between first edge 154 and second edge 155 of second optical waveguide 150 is spaced at a more constant or fixed distance, and second optical waveguide 150 is translated away from first optical waveguide 120 such that there is no longer any overlap between the two waveguides.

FIG. 3A shows the relative locations of a first optical waveguide 120 and second optical waveguide 150 of PSR 100 from first end 130 to second end 140 along a longitudinal direction of PSR 100, according to an example embodiment. In the case of FIG. 3A (and of FIGS. 3B and 3C) first optical waveguide 120 is shown above second optical waveguide 150. The "start," "25%," "50%," "75%," and "end" designators represent how far along the x-axis direction power measurements are detected for purposes of the simulations shown in FIGS. 3B and 3C.

FIGS. 3B and 3C show, respectively, and corresponding to FIG. 3A, simulated optical power of a TE0 signal input at input 125 of first optical waveguide 120, and a TM0 signal input at input 125 of first optical waveguide 120 and rotated to TE0 in second optical waveguide 150, according to an example embodiment. As can be seen from these figures, TE0 that is input into PSR 100 passes directly through first optical waveguide 120 with minimal loss, and TM0 that is input into PSR 100 is rotated and modemuxed into TE0 by second optical waveguide 150 interacting with first optical waveguide 120.

Figure 4:
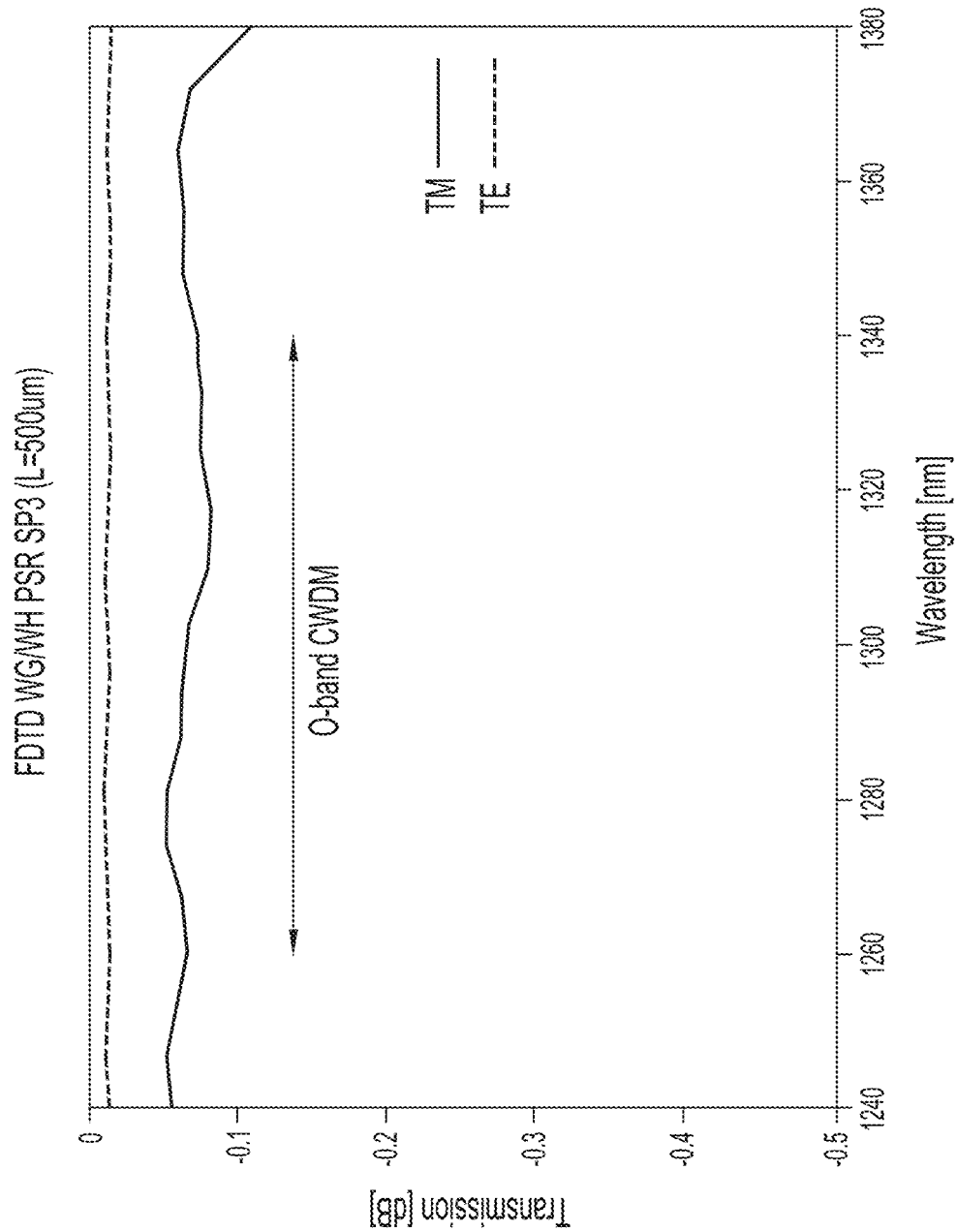
FIG. 4 is a graph of transmission performance of TE and TM modes in the first PSR, according to an example embodiment.

FIG. 4 is a graph of transmission performance of TE and TM modes in PSR 100, according to an example embodiment. As shown, there is very little loss across, e.g., the O-band from 1260 nm to 1340 nm. The simulation shown in FIG. 4 is a finite-difference time domain (FDTD) analysis.

Figure 5:
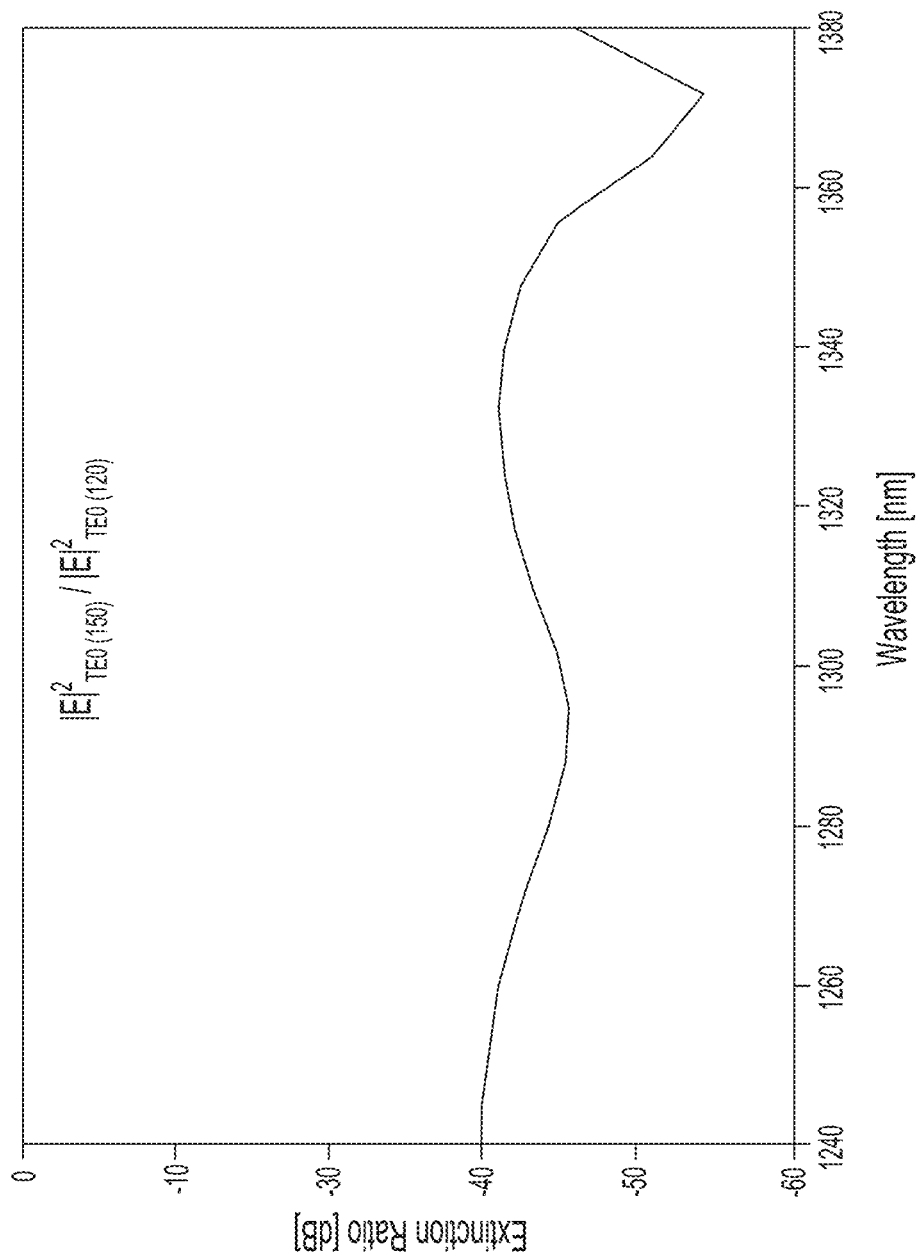
FIG. 5 is a graph of the simulated extinction ratio between the TE0 outputs of each of the first optical waveguide and the second optical waveguide of the first PSR, according to an example embodiment.

FIG. 5 is a graph of the simulated extinction ratio between the first output 127 and second output 157 of each of first optical waveguide 120 and second optical waveguide 150 of PSR 100, according to an example embodiment. The simulation indicates the outputs of PSR 100 will have better than 30 dB TE isolation.

Figure 6:
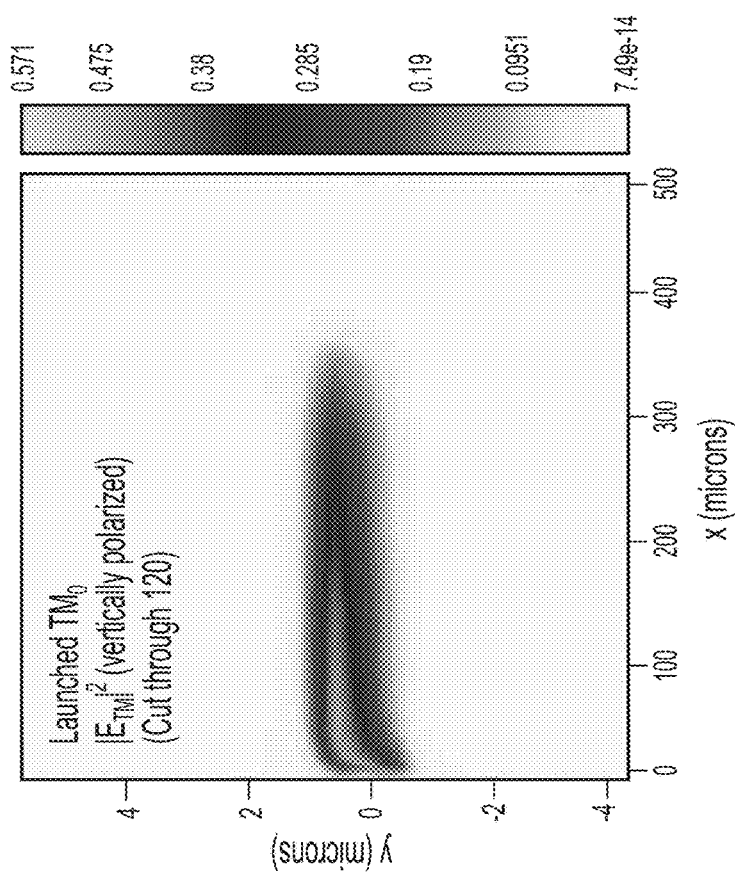
FIG. 6 shows simulated power of TM0 launched through the first optical waveguide of the first PSR, according to an example embodiment.

FIG. 6 shows simulated power of TM0 launched through first optical waveguide 120 of PSR 100, according to an example embodiment. As can be seen, IMO power decreases along the length of first optical waveguide 120 as the interaction with second optical waveguide 150 causes the TM0 to hybridize with a TE1 mode that quickly localizes to the second optical waveguide 150.

Figure 7:
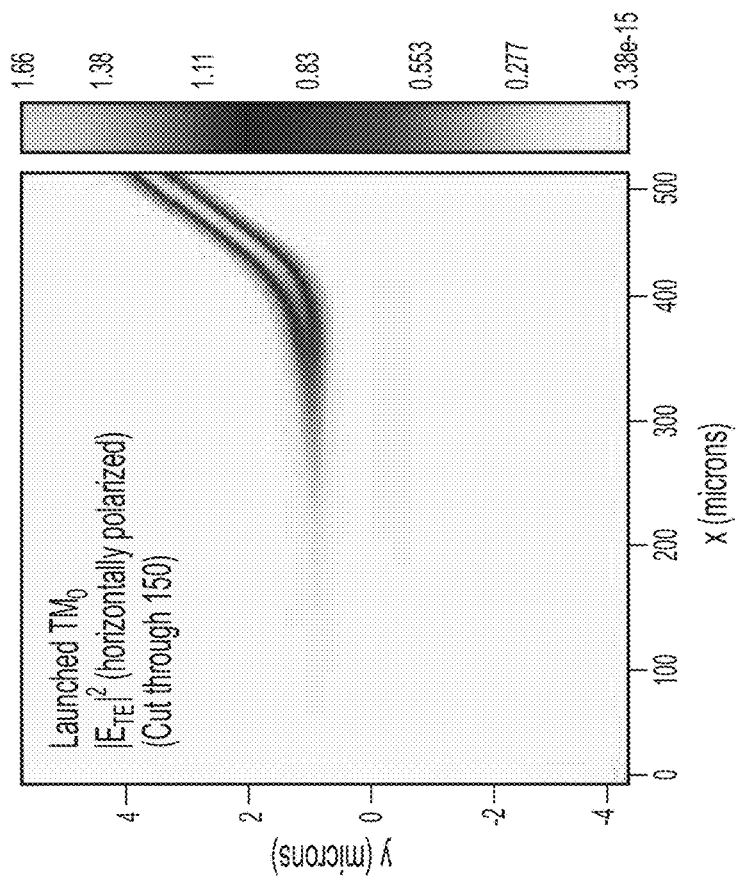
FIG. 7 shows simulated power of TM0 launched through the second optical waveguide of the first PSR, according to an example embodiment.

FIG. 7 shows simulated power of TM0 launched through first optical waveguide 120 of PSR 100, according to an example embodiment. As can be seen, the power of the TM0 signal on second optical waveguide 150 increases towards second output 157.

Figure 8:
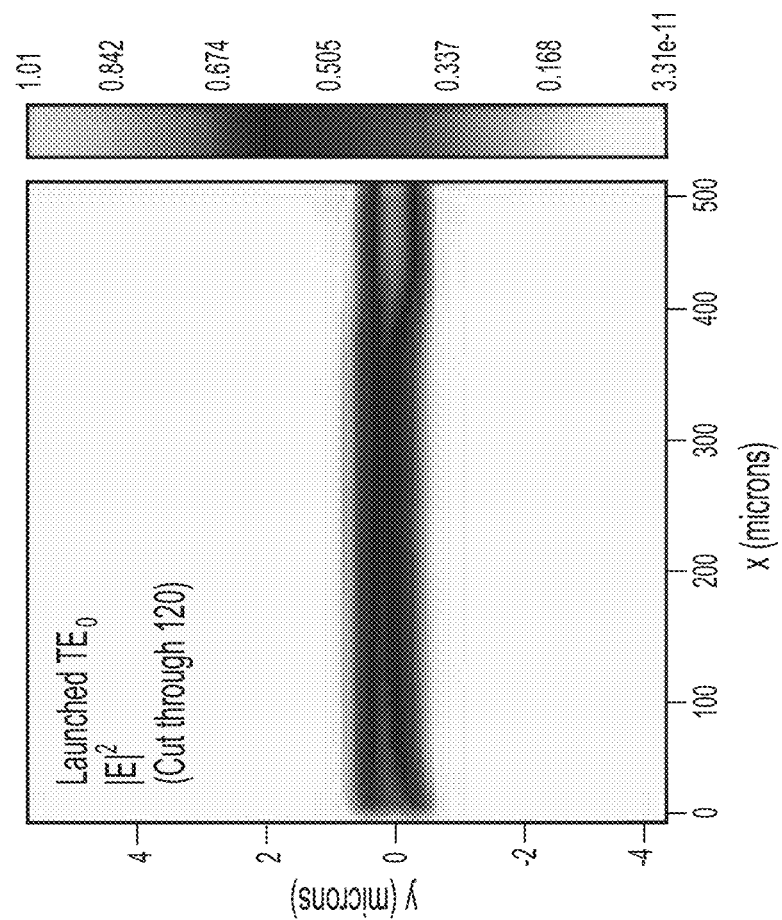
FIG. 8 shows simulated power of TE0 launched through the first optical waveguide of the first PSR, according to an example embodiment.

FIG. 8 shows simulated power of TE0 launched through first optical waveguide 120 of PSR 100, according to an example embodiment. As can be seen, there is very little loss across the length of the device.

Figure 9:
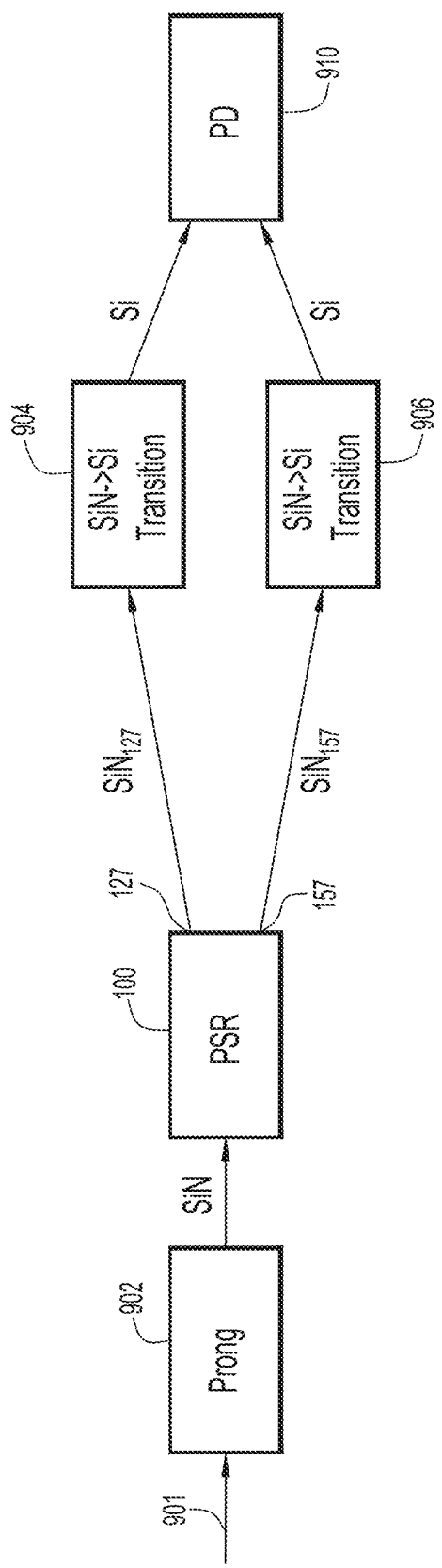
FIG. 9 is block diagram of a receiver use case for a PSR, according to an example embodiment.

FIG. 9 is block diagram of a receiver use case for PSR 100, according to an example embodiment. As shown, a prong 902 receives a fiber optic cable 901 and delivers a multiplexed optical signal (e.g., modulated TE0 and TM0 optical signals) via a SiN waveguide to PSR 100. PSR 100, in turn, rotates and modemuxes the multiplexed optical signal and outputs a first optical signal $SiN_{127}$ via first output 127 and a second optical signal SiN→Si via second output 157. First optical signal $SiN_{127}$ is provided to SiN→Si transition 904, and an output of SiN→Si transition 904 is provided to a photo detector (PD) 910, Second optical signal $SiN_{157}$ is provided to SiN→Si transition 906, and an output of SiN→Si transition 906 is provided to PD 910. PD 910 provides an electrical output corresponding to the optical signals supplied by fiber optic cable 901.

Figure 10:
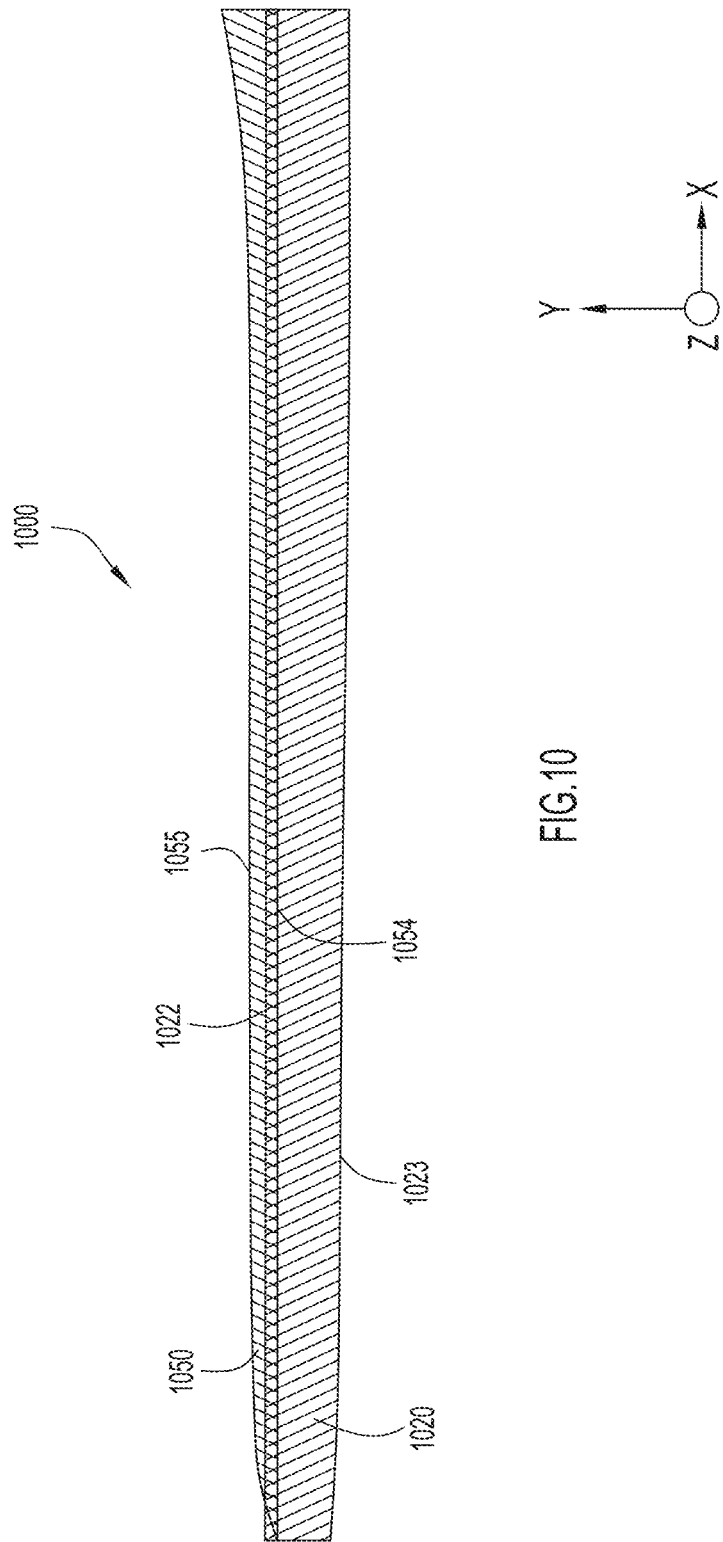
FIG. 10 is a plan view of a second PSR, according to an example embodiment.

FIG. 10 is a plan view of a portion of a second PSR 1000, according to an example embodiment. FIG. 10 shows a portion of second PSR 100 that corresponds to, e.g., second region 182 of PSR 100. That is, FIG. 10 does not show a bent end with tip on a input side, nor the fully translated waveguides at an output end. However, those skilled in the art will appreciate that second PSR 1000 may indeed include those features as well. Second PSR 1000 includes, on a substrate (not shown in FIG. 10), a first waveguide 1020 with side 1022 and side 1023, and a second waveguide 1050 with edge 1054 and edge 1055. Second waveguide 1050 partially overlaps first waveguide 1020. A layer of $SiO_2$ is disposed between (in a z-axis direction) the first waveguide 1020 and second waveguide 1050. In this embodiment, side 1022 and edge 1054 remain fixed, similar to PSR 100. However, unlike PSR 100, in this embodiment, side 1023 and edge 1055 both shift away from each other to create a diagonal taper. An optical signal comprising both TE0 and TM0 modes may be presented to an input end of second PSR 1000 (i.e., on the left hand side of FIG. 10), and an output end of PSR 1000 (i.e., on the right hand side of FIG. 10), outputs two TE0 modes. As shown in FIG. 10, towards the output end, second waveguide 1050 shifts or translates at an increased pace thereby providing two non-overlapping outputs, like that shown in FIG. 1.

In an embodiment, a width, in the y-axis direction, of first waveguide 1020 may be 1-2 μm, and a width, in the y-axis direction, of second waveguide 1050 may be 0.1-1 μm. First waveguide 1020 and second waveguide 1050 may have thicknesses of, e.g., 200-300 nm.

Figure 11:
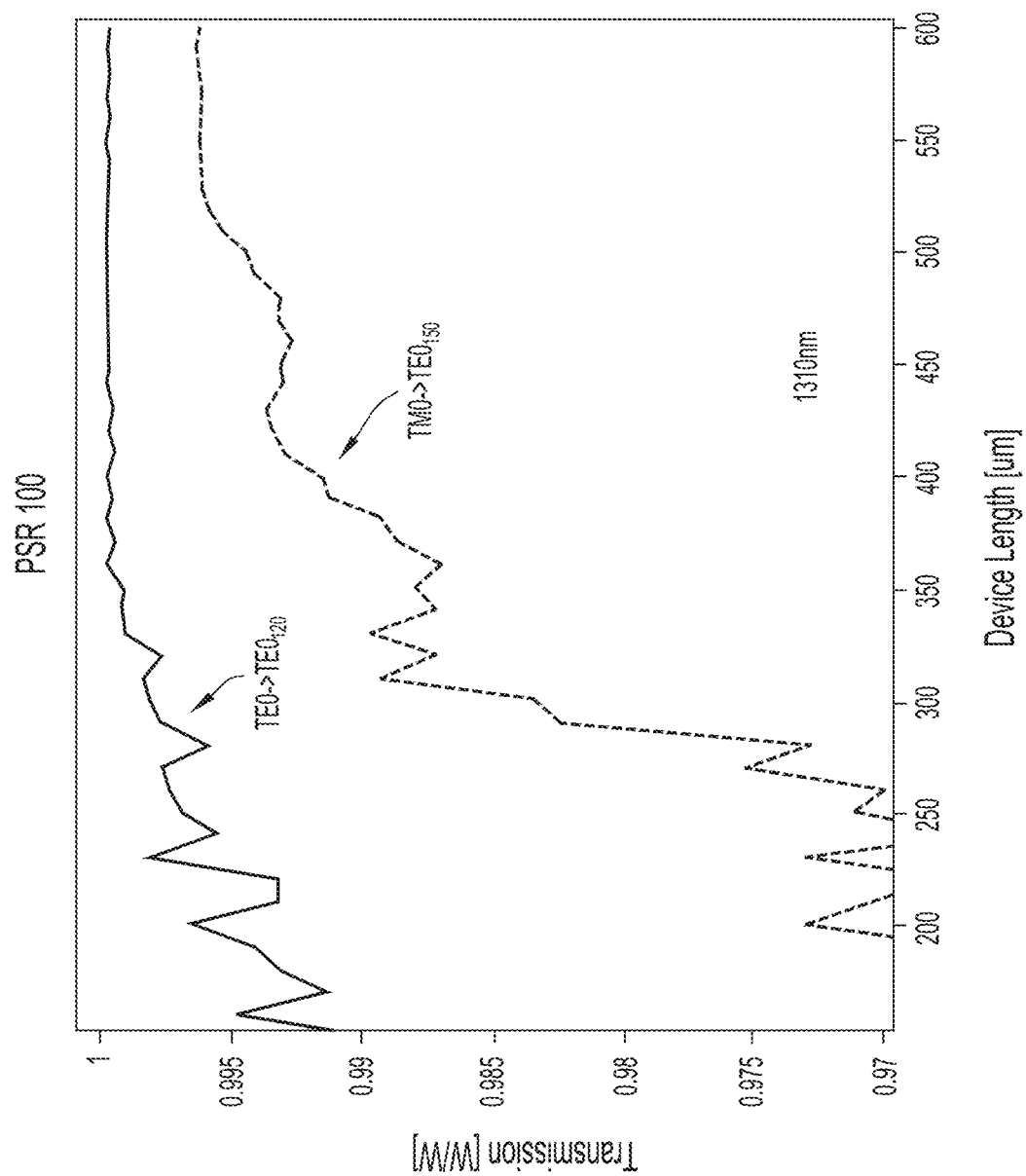
FIG. 11 is a graph showing transmission efficiency for the first PSR, according to an example embodiment.

FIG. 11 is a graph showing transmission efficiency of PSR 100, according to an example embodiment. The graph shows simulated TE0 power over first optical waveguide 120 ($TE0_{120}$) and TE0 power (with TM0 input) over second optical waveguide 150 ($TE0_{150}$).

Figure 12:
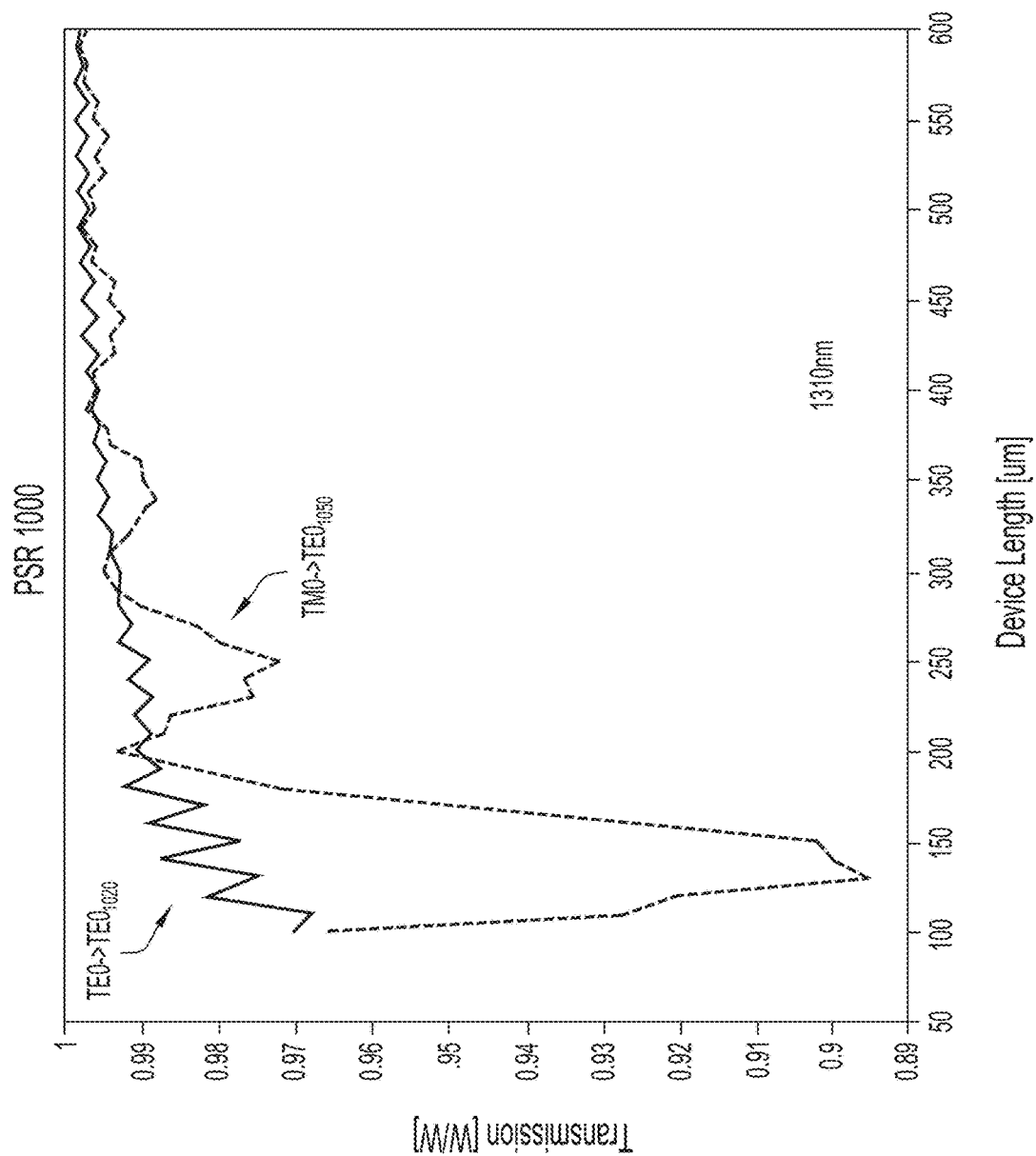
FIG. 12 is a graph showing transmission efficiency for the second PSR, according to an example embodiment.

FIG. 12 is a graph showing transmission efficiency for second PSR 1000, according to an example embodiment. The graph shows simulated TE0 power over first waveguide 1020 ($TE0_{1020}$) and TE0 power (with TM0 input) over second waveguide 1050 ($TE0_{1050}$).

Figure 13:
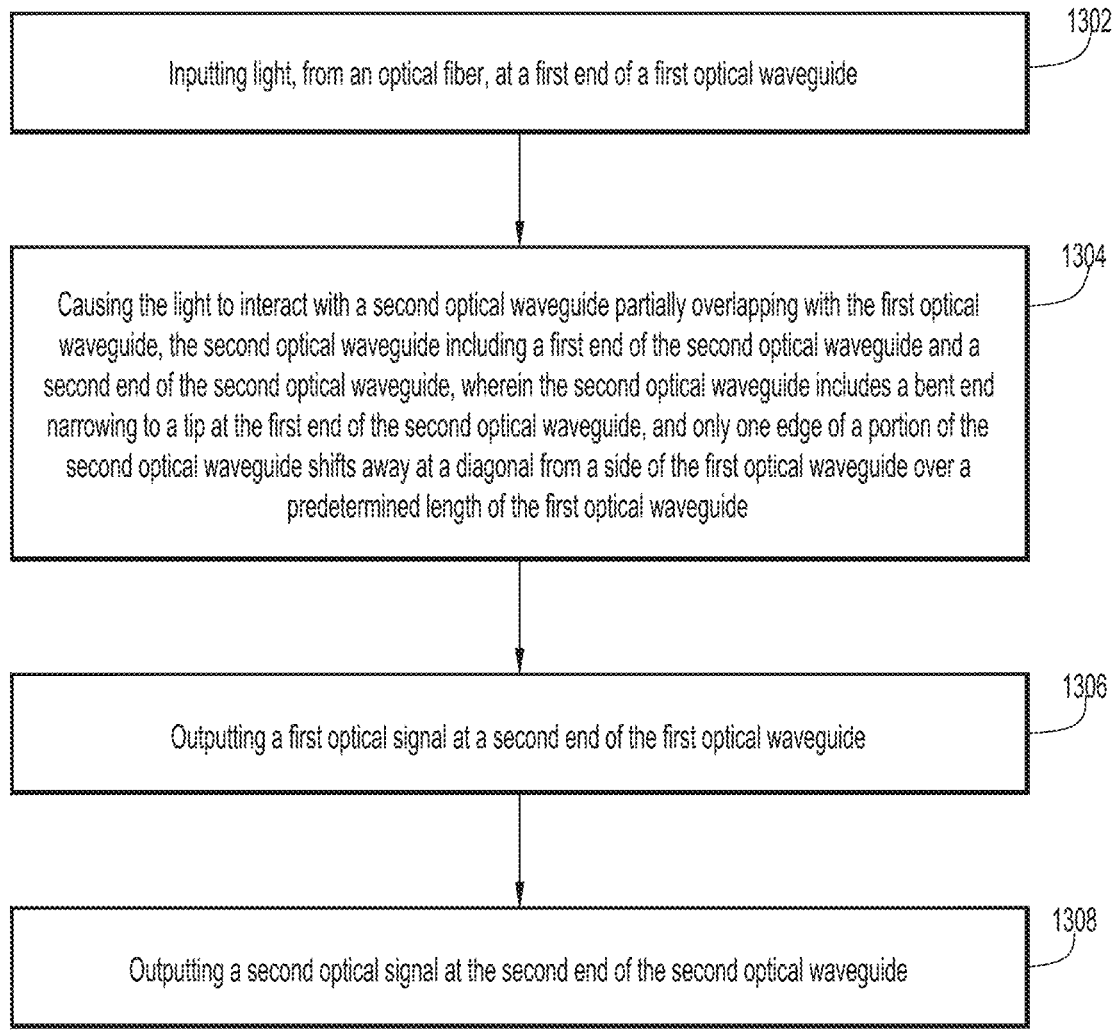
FIG. 13 is a flowchart showing a series of operations for processing light with a PSR, according to an example embodiment.

FIG. 13 is a flowchart showing a series of operations for processing light with a PSR, according to an example embodiment. At 1302, an operation includes inputting light, from an optical fiber, at a first end of a first optical waveguide disposed in a substrate. At 1304, an operation includes causing the light to interact with a second optical waveguide partially overlapping with the first optical waveguide. The second optical waveguide includes a first end of the second optical waveguide and a second end of the second optical waveguide, wherein the second optical waveguide includes a bent end narrowing to a tip at the first end of the second optical waveguide, and only one edge of a portion of the second optical waveguide shifts away at a diagonal from a side of the first optical waveguide over a predetermined length of the first optical waveguide. The operations further include, at 1306, outputting a first optical signal at a second end of the first optical waveguide. And, at 1308, an operation includes outputting a second optical signal at the second end of the second optical waveguide.

Variations and Implementations

Embodiments described herein may include or be part of one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a device is provided and includes a substrate, a first optical waveguide disposed on the substrate at a first layer, the first optical waveguide having a substantially rectangular shape and longitudinally arranged between a first end of the first optical waveguide and a second end of the first optical waveguide, and a second optical waveguide arranged to have a partial and fixed amount of overlap over a predetermined length of the first optical waveguide.

The device may be a polarization splitter rotator, and the predetermined length of the first optical waveguide corresponds to a rotator section of the polarization splitter rotator.

In device, the second optical waveguide may include, at a first end of the second optical waveguide, a bent end that narrows to a tip that is translated away from the first optical waveguide.

In the device, the second optical waveguide includes a first edge of the second optical waveguide and a second edge of the second optical waveguide, and the first edge of the second optical waveguide remains fixed and parallel to a first side of the first optical waveguide and a second side of the first optical waveguide over the predetermined length of the first optical waveguide.

In the device, the second edge of the second optical waveguide may translate away from the first edge of the second optical waveguide.

In the device, the second optical waveguide may fully translate away from the first optical waveguide such that no overlap exists between the second optical waveguide and the first optical waveguide.

In the device, at least one of the first optical waveguide and the second optical waveguide is comprised of silicon nitride.

The device may further include an optical input at a first end of the first optical waveguide, a first optical output at a second end of the first optical waveguide, and a second optical output at a second end of the second optical waveguide.

In the device, the first end of the first optical waveguide and the second end of the first optical waveguide may be tapered compared to a region of the first optical waveguide between the first end of the first optical waveguide and the second end of the first optical waveguide.

In the device, the region of the first optical waveguide is about 1.5 µm wide and 250 nm thick, and the first end of the first optical waveguide and the second end of the first optical waveguide are about 1 µm wide.

The device may be 400-500 µm long.

In another embodiment, a device includes a first optical waveguide, and a second optical waveguide, wherein the device includes a first region, a second region, and third region, the second region disposed between the first region and the second region, wherein in the first region, the second optical waveguide comprises a bent end that is translated away from the first optical waveguide, wherein in the second region, the second optical waveguide has a first edge that shifts away from a second edge of the second optical waveguide, and the second optical waveguide at least partially overlaps with the first optical waveguide, and wherein in the third region, the second optical waveguide translates fully away from any overlap with the first optical waveguide.

In the device, the bent end may taper to a pointed tip.

In the device, in the second region, the second edge of the second optical waveguide may remain fixed and substantially parallel with a side of the first optical waveguide.

In the device, in the first region and in the second region the first optical waveguide may taper to a first width that is smaller than a second width in the second region.

In the device at least one of the first optical waveguide and the second optical waveguide is comprised of silicon nitride.

The device may be 400-500 µm long.

In still another embodiment, a method is provided and includes inputting light, from an optical fiber, at a first end of a first optical waveguide, causing the light to interact with a second optical waveguide partially overlapping with the first optical waveguide, the second optical waveguide including a first end of the second optical waveguide and a second end of the second optical waveguide, wherein the second optical waveguide includes a bent end narrowing to a tip at the first end of the second optical waveguide, and only one edge of a portion of the second optical waveguide shifts away at a diagonal from a side of the first optical waveguide over a predetermined length of the first optical waveguide, outputting a first optical signal at a second end of the first optical waveguide, and outputting a second optical signal at the second end of the second optical waveguide.

In the method, the light may comprise a transverse electric optical (TE0) mode and a transverse magnetic optical (TM0) mode.

In the method, the first optical signal may comprise the TE0 mode, and the second optical signal may be a TE0 signal generated by rotating and modemuxing the TM0 mode via interaction between the first optical waveguide and the second optical waveguide.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device comprising:
   a substrate;
   a first optical waveguide disposed in the substrate at a first layer, the first optical waveguide having a substantially rectangular shape and longitudinally arranged between a first end of the first optical waveguide and a second end of the first optical waveguide; and
   a second optical waveguide, disposed in the substrate at a second layer, vertically, in cross-section, above the first layer, and arranged to have a partial and fixed amount of overlap with, and over a predetermined length of, the first optical waveguide,
   wherein a first end of the second optical waveguide curves towards a first side of the first optical waveguide, and a second end of the second optical waveguide curves away from the first side of the first optical waveguide, and
   wherein the second optical waveguide comprises, at a first end of the second optical waveguide, a bent end that narrows to a tip that is translated away from the first optical waveguide.

2. The device of claim 1, wherein the device is a polarization splitter rotator, and the predetermined length of the first optical waveguide corresponds to a rotator section of the polarization splitter rotator.

3. The device of claim 1, wherein the second optical waveguide includes a first edge of the second optical waveguide and a second edge of the second optical waveguide, and the first edge of the second optical waveguide remains fixed and parallel to the first side of the first optical waveguide and a second side of the first optical waveguide over the predetermined length of the first optical waveguide.

4. The device of claim 3, wherein the second edge of the second optical waveguide translates away from the first edge of the second optical waveguide.

5. The device of claim 1, wherein the second optical waveguide fully translates away from the first optical waveguide such that no vertical overlap exists between the second optical waveguide and the first optical waveguide.

6. The device of claim 1, wherein at least one of the first optical waveguide and the second optical waveguide is comprised of silicon nitride.

7. The device of claim 1, further comprising an optical input at a first end of the first optical waveguide, a first optical output at a second end of the first optical waveguide, and a second optical output at a second end of the second optical waveguide.

8. The device of claim 1, wherein the first end of the first optical waveguide and the second end of the first optical waveguide are tapered compared to a region of the first optical waveguide between the first end of the first optical waveguide and the second end of the first optical waveguide.

9. The device of claim 8, wherein the region of the first optical waveguide is about 1.5 μm wide and 250 μm thick, and the first end of the first optical waveguide and the second end of the first optical waveguide are about 1 μm wide.

10. The device of claim 1, wherein the device is 400-500 μm long.

11. A device comprising:
    a first optical waveguide; and
    a second optical waveguide,
    wherein the device includes a first region, a second region, and a third region, the second region disposed between the first region and the third region,
    wherein in the first region, the second optical waveguide comprises a bent end that curves away from the first optical waveguide,
    wherein in the second region, the second optical waveguide is disposed, vertically in cross-section, in a layer above the first optical waveguide and has a first edge that shifts away from a second edge of the second optical waveguide, and the second optical waveguide at least partially overlaps with, and over a predetermined length of, the first optical waveguide, and
    wherein in the third region, the second optical waveguide translates fully away from any overlap with the first optical waveguide.

12. The device of claim 11, wherein the bent end tapers to a pointed tip.

13. The device of claim 11, wherein in the second region, the second edge of the second optical waveguide remains fixed and substantially parallel with a side of the first optical waveguide.

14. The device of claim 11, wherein in the first region and in the second region the first optical waveguide tapers to a first width that is smaller than a second width in the second region.

15. The device of claim 11, wherein at least one of the first optical waveguide and the second optical waveguide is comprised of silicon nitride.

16. The device of claim 12, wherein the device is 400-500 μm long.

17. A method comprising:
    inputting light, from an optical fiber, at a first end of a first optical waveguide;
    causing the light to interact with a second optical waveguide partially overlapping with the first optical waveguide, the second optical, waveguide including a first end of the second optical waveguide and a second end of the second optical waveguide, wherein the second optical waveguide is disposed, vertically, in cross-section, in a layer above the first optical waveguide and includes a bent end narrowing to a tip at the first end of the second optical waveguide, and one edge of a portion of the second optical waveguide shifts away at a diagonal from a side of the first optical waveguide over a predetermined length of the first optical waveguide;
    outputting a first optical signal at a second end of the first optical waveguide; and
    outputting a second optical signal at the second end of the second optical waveguide.

18. The method of claim 17, wherein the light comprises a transverse electric optical mode signal and a transverse magnetic optical (TM0) mode signal.

19. The method of claim 18, wherein the first optical signal comprises the transverse electric optical mode signal, and the second optical signal is the transverse magnetic optical mode signal generated by rotating and modemuxing the transverse magnetic optical mode signal via interaction between the first optical waveguide and the second optical waveguide.

20. The device of claim 1, wherein the first optical waveguide is configured to receive a transverse electric optical mode signal and a transverse magnetic optical (TM0) mode signal.

* * * * *

UNITED STATES PATENT AND TRADEMARK OFFICE
CERTIFICATE OF CORRECTION

PATENT NO. : 11,988,870 B2
APPLICATION NO. : 17/675057
DATED : May 21, 2024
INVENTOR(S) : Jean-Luc Joseph Tambasco Page 1 of 1

It is certified that error appears in the above-identified patent and that said Letters Patent is hereby corrected as shown below:

In the Claims

Claim 17, Column 12, Line 36, please replace "the second optical, waveguide" with --the second optical waveguide--

Signed and Sealed this
Twenty-seventh Day of August, 2024

Katherine Kelly Vidal
*Director of the United States Patent and Trademark Office*